June 3, 1969

C. R. RICE 3,447,439

CONFIGURATION ON MOLDED BELLOWS

Filed Aug. 23, 1966

INVENTOR.
Christopher R. Rice
BY
Brown and Mikulka
and
Leonard S. Selman
ATTORNEYS United States Patent Office 3,447,439
Patented June 3, 1969

3,447,439
CONFIGURATION ON MOLDED BELLOWS
Christopher R. Rice, Wakefield, Mass., assignor to Polaroid Corporation, Cambridge, Mass., a corporation of Delaware
Filed Aug. 23, 1966, Ser. No. 574,461
Int. Cl. G03b 17/04
U.S. Cl. 95—39                                                9 Claims

ABSTRACT OF THE DISCLOSURE

A bellows for a camera is formed of a sheet of flexible material, the walls of the bellows being folded alternately toward and away from the major axis, an outside fold being in alignment with inside folds on adjacent walls. A plurality of edge folds are provided at the corners, and the corners at the junction points of the edge folds and the outside folds are rounded to reduce stress when the bellows is flexed.

---

This invention relates to photography and, more particularly, to the novel construction of a camera bellows.

In the usual folding type camera a protected light path is provided between the objective lens and film plane by an expansible and collapsible bellows. The flexible nature of the bellows permits easy adjustment of the lens relative to the film plane for focusing and other optical purposes. Also the bellows may be completely collapsed to a substantially flat position to allow movement of the lens into proximity with the camera body, thereby providing a much more compact device in the folded position to facilitate handling, transport and storage. The bellows is normally attached in light-tight engagement at its front and rear ends, respectively, with the lens board or shutter housing and the camera body.

Copending U.S. patent applications Ser. No. 395,402, filed Sept. 10, 1964, in the name of Edison R. Brandt and Frank W. Wright, and Ser. No. 525,664, filed Feb. 7, 1966, in the name of Christopher R. Rice, both assigned to the present applicant's assignee, disclose novel camera bellows fabricated by heating and reforming the bellows material, rather than by cutting and folding according to previous, conventional techniques. One of the principal advantages of a satisfactory bellows fabricated from thermoplastic materials by molding techniques is the significant economy realized by the speed and repeatability of such methods of manufacture. The present invention is also concerned with camera bellows molded from materials such as plastics and having certain additional improvements and refinements not found in the prior art, including the molded bellows disclosed in the aforementioned copending applications.

It is a general object of this invention to provide a camera bellows of molded termoplastic material having a high flex life and improved folding characteristics.

A more specific object of the invention is to provide a bellows having an improved edge configuration.

Another object is to provide a novel camera bellows which is simple and economical in manufacture and rugged and durable in use.

Other objects of the invention will in part be obvious and will in part appear hereinafter.

The invention accordingly comprises an article of manufacture possessing the features, properties, and relation of elements which will be exemplified in the article hereinafter described and the scope of the application of which will be indicated in the claims.

For a fuller understanding of the nature and objects of the invention, reference should be had to the following detailed description taken in connection with the accompanying drawings wherein.

There are several important criteria for measuring the performance of a good camera bellows. One of the most important of these is the ability to collapse to a substantially flat position without bunching at the corners which could cause distortion and impingement into protected light path. Another important characteristic is the ability to withstand repeated flexing during the lifetime of the camera without cracking or forming pin holes which would permit light to enter and render the bellows useless. In tests made on the previously available plastic bellows most of these failures were found to occur at the sharp corners where the adjacent sides are joined.

Earlier attempts at molding plastic camera bellows using a male mold and vacuum forming resulted in a bellows wherein the wall thickness at the sharp corners was found to be significantly greater than the remainder of the bellows. For this reason, the bellows did not fold flat in the corners. In order to assure that the bellows would fold flat it became necessary to severely heat set the bellows in a compressed condition. This secondary heat set operation which consists of subjecting the bellows to a high temperature for a period of time tends to degrade the material if either the temperature or the time is extended.

It has been discovered that by rounding these sharp corners and replacing them with a radius there is less plastic buildup in these areas. Consequently, the bellows has less tendency to bulge at the corners and thus the secondary heat-set operation is less critical and both the time and the temperature can be reduced.

If the plastic is relatively thick at the sharp corners flexing the bellows from flat to maximum extension causes a high stress at these thick corners. Consequently, the flex life of the bellows may be significantly reduced. Due to the radius at the corners it is possible in the practice of this invention to make thinner corners and the stress when flexed is reduced increasing the flex life. Using a Dow Chemical Company black ethylene/vinyl acetate material, a flex life of over 50,000 cycles is now obtainable with radiused corners where previously some failures occurred at less than 25,000 cycles.

The radius at the corners of the bellows is obtained by forming the male mold with rounded corners causing the heated thermoplastic material to conform to the shape of the mold, cooling the material sufficiently to set in the shape of the mold and then stripping the material from the mold. Another advantage of the rounded corners is the relative ease with which the bellows may be stripped of the male mold without the danger of tearing in the previously sharp corners of the mold.

Figure 1:
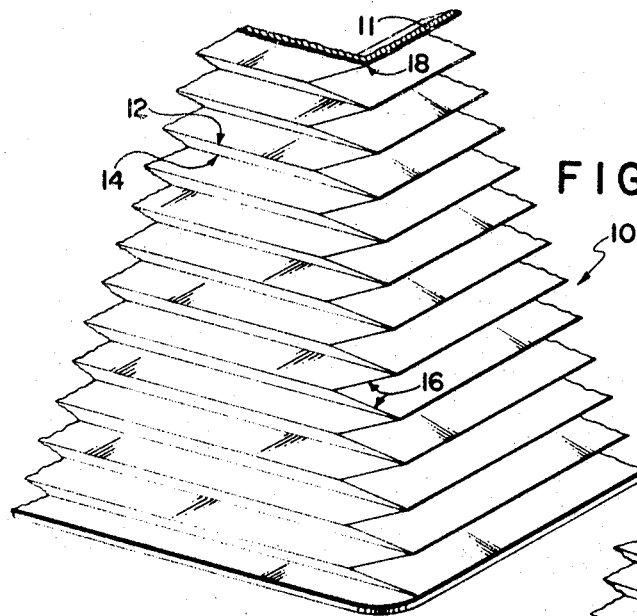
FIGURE 1 is a fragmentary perspective view of a plastic bellows having an external configuration identical to that of a conventional laminated bellows.

Referring now to the drawing, reference numeral 10 designates a flexible plastic bellows manufactured by the process described in the aforesaid application, Ser. No. 395,402 using a male mold and the vacuum technique described therein. The external configuration of this bellows is identical to that of a conventional camera bellows of folded sheet material except of course there are no seams. The four walls of the bellows 10 are substantially rectangular in cross section as seen in FIGURE 1 and designated by reference numeral 11. Each of said walls is folded alternately toward and away from the major axis of the bellows to form outside folds 12 and inside folds 14 with each outside fold on one side in alignment with inside folds of the two adjacent sides. The sides of the bellows are hinged to each other by a plurality of edge folds 16 which form a zigzag pattern as they join the outside folds on one side of the bellows with the outside folds on the two adjacent sides. This construction allows the bellows to collapse. As shown in FIGURE 1, the edge folds 16 have a straight profile and sharp corners 18 are formed at the junction point of the edge folds with the outside folds.

Figure 2:
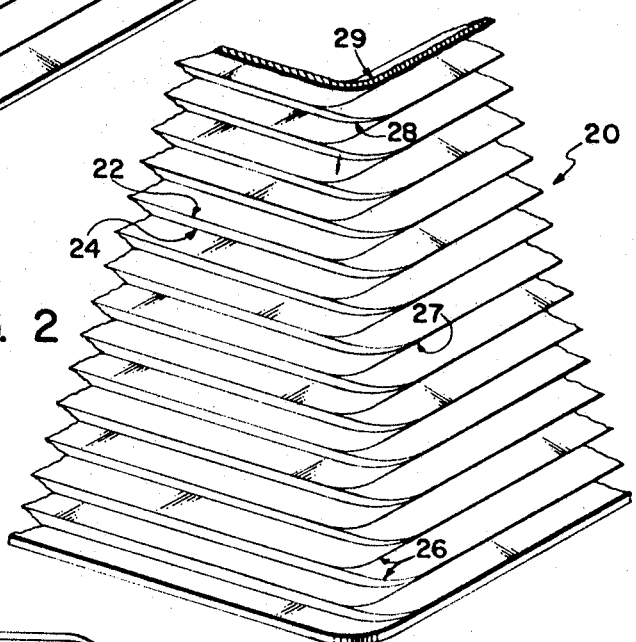
FIG. 2 is a fragmentary perspective view of the plastic bellows constructed according to the present invention.
Figure 3:
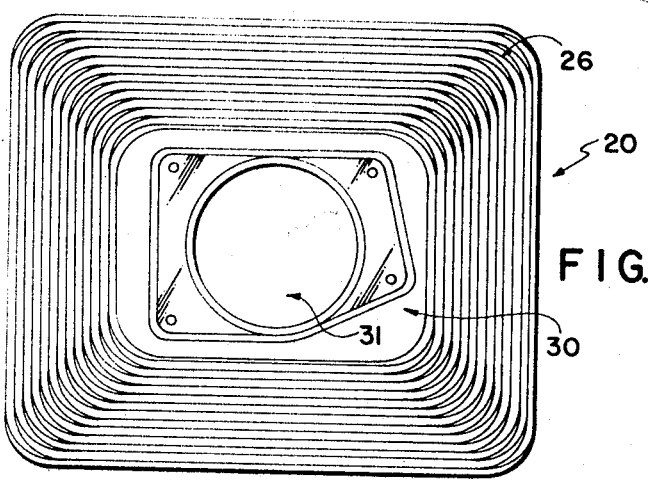
FIG. 3 is a plan view of a plastic bellows embodying this invention.

A preferred embodiment of the bellows of the present invention is shown in FIG. 2 and denoted by the reference numeral 20. Bellows 20 also comprises alternate outside folds 22 and inside folds 24 with each outside fold on one side in alignment with inside folds of the two adjacent sides. A plurality of edge folds are shown at 26 which also form a zigzag pattern as they provide a hinge for adjacent walls. Reference numeral 27 denotes the improved configuration wherein the sharp corners at the junction points of the edge folds 26 and the outside folds 22 are eliminated and replaced by the rounded configuration shown. Rather than the straight profile of the bellows shown in FIGURE 1, the edge folds now have a curved profile as clearly indicated by reference numeral 26 in FIG. 3 which is a plan view of the bellows 20 shown in FIG. 2. A cross section of the improved bellows taken through the intersection point between an inside fold and outside fold is shown at 29 in FIG. 2 clearly showing the rounded corner. It should also be noted that the inside folds 24 as shown in FIG. 2 are also rounded at end portions 28 and curve toward the junction point of the edge folds 26 and outside folds 22. Bellows 20 further includes front plate or frame 30, having therein large, centrally disposed opening 31 for the passage of light to the film upon operation of the camera shutter.

Basic to this invention is the concept of molding the alternate outside and inside folds into the flexible plastic sheet rather than by folding. As brought out previously, this may be accomplished by first forming a male mold to the exact configuration desired in the flexible plastic material and molding the flexible plastic material around the mold using the well-known technique of vacuum molding. The advantage in this technique is not only in the speed and economy of manufacture but also that it is possible to obtain configurations using material that is plastic and will flow that are impossible to obtain by merely folding a flat sheet of material in the manner most conventional bellows are manufactured today. Thus the mold used in producing the improved bellows of the present invention is formed generally in the shape of a conventional expanded camera bellows but with the aforementioned improved configuration. The corners of the mold at the junction points where the edge folds and the outside folds are joined are provided with a radius and the portion of the mold which forms the edge fold is provided with a curved profile. To accomplish this, concavities of the male mold which form the inside fold lines of the bellows are lengthened and curved at their ends toward the aforesaid junction point. The ridges of the male mold which form the outside fold lines are thus slightly shortened as part of their length is taken up in rounding the sharp corners.

The many advantages of the improved bellows configuration are re-emphasized here. The reduction of stress at the corners resulting in the increased flex life is due to the new configuration which allows a thinner corner to be molded. Since the thinner corners allow the bellows to fold flatter, the aforementioned material degrading heat set operation can be shortened in time and the temperature reduced. Finally, the elimination of the sharp corners on the male forming mold eliminates tearing of the plastic bellows when it is stripped off the mold.

Since certain changes may be made in the above article without departing from the scope of the invention herein involved, it is intended that all matter contained in the above description or shown in the accompanying drawing shall be interpreted as illustrative and not in a limiting sense.

What is claimed is:

1. An expansible and collapsible bellows for use on a photographic camera or the like, said bellows comprising:

a sheet of flexible material defining a polygonal space enclosed by wall portions, each of said walls being folded alternately toward and away from the major axis of the bellows forming outside and inside folds with each outside fold in alignment with inside folds on adjacent wall portions; and a plurality of edge folds along the corners of said bellows forming a hinge between the walls allowing the bellows to collapse, said edge folds joining the outside folds on one wall of the bellows with the outside folds on the adjacent walls, the corners at the junction points of said edge folds and said outside folds being rounded whereby stress is reduced when flexing said bellows increasing the flex life of said bellows.

2. The invention according to claim 1 wherein said wall portion includes four sides joined together to have a substantially rectangular cross section.

3. The invention according to claim 1 wherein said wall portion includes four sides joined together to have a substantially rectangular cross section, said sides converging from one end of said bellows toward the other whereby said bellows has a generally pyramidal shape in the expanded position.

4. The invention according to claim 1 wherein end portions of the inside folds curve toward the junction point of the edge folds and outside folds.

5. An expansible and collapsible bellows for use on a photographic camera or the like, said bellows comprising:

a sheet of thermoplastic material defining a polygonal space enclosed by wall portions, each of said walls being folded alternately toward and away from the major axis of the bellows forming outside and inside folds with each outside fold in alignment with inside folds on adjacent wall portions; and a plurality of edge folds along the corners of said bellows forming a hinge between the walls allowing the bellows to collapse, said edge folds joining the outside folds on one wall of the bellows with the outside folds on the adjacent walls, the corners at the junction points of said edge folds and said outside folds being rounded and said edge folds having a curved profile whereby stress is reduced when flexing said bellows increasing the flex life of said bellows, 6. The invention according to claim 5 wherein said wall portion includes four sides joined together to have a substantially rectangular cross section.

7. The invention according to claim 5 wherein said wall portion includes four sides joined together to have a substantially rectangular cross section, said sides converging from one end of said bellows toward the other whereby said bellows has a generally pyramidal shape in the expanded position.

8. The invention according to claim 5 wherein end portions of the inside folds curve toward the junction point of the edge folds and outside folds.

9. An expansible and collapsible bellows for use on a photographic camera, or the like, said bellows comprising:
    a sheet of flexible material defining a polygonal space enclosed by wall portions, each of said walls being folded alternately toward and away from the major axis of the bellows forming outside and inside folds with each outside fold in alignment with inside folds on adjacent wall portions, corners being formed at the junction points where each inside fold joins the aligned outside folds on adjacent wall portions, said inside folds being curved at their end portions toward the respectively aligned outside folds to reduce the sharpness of said corners.

References Cited

UNITED STATES PATENTS 2,578,111   12/1951   Turner _____ 95—39

FOREIGN PATENTS 350,719   4/1922   Germany.

JOHN M. HORAN, *Primary Examiner.*